G. A. PEDDLE.
TOOL FOR CUTTING INTERIOR SCREW THREADS.
APPLICATION FILED DEC. 13, 1910.
1,027,625.
Patented May 28, 1912.
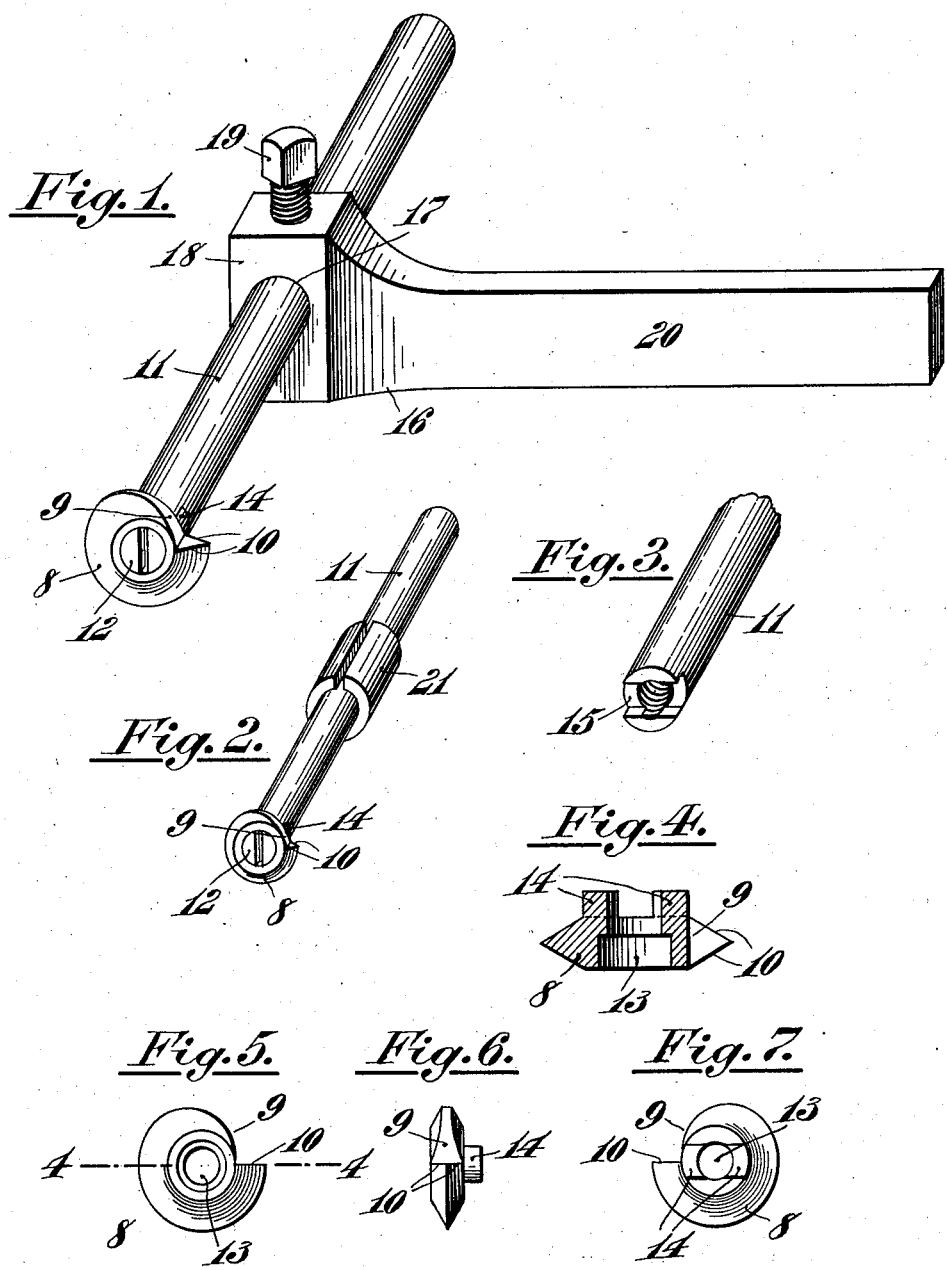

UNITED STATES PATENT OFFICE.

GEORGE A. PEDDLE, OF PHILADELPHIA, PENNSYLVANIA.

TOOL FOR CUTTING INTERIOR SCREW-THREADS.

1,027,625.  Specification of Letters Patent.  Patented May 28, 1912.

Application filed December 13, 1910. Serial No. 597,092.

*To all whom it may concern:*

Be it known that I, GEORGE A. PEDDLE, a citizen of the United States, residing at Philadelphia, in the county of Philadelphia and State of Pennsylvania, have invented certain new and useful Improvements in Tools for Cutting Interior Screw-Threads, of which the following is a specification.

My invention relates to a tool for cutting interior screw threads and it has particular relation to the construction and arrangement of a tool for this purpose having a replaceable cutter element.

Heretofore, while it has been common to employ tools for cutting exterior screw threads in which removable cutter elements were employed, the tool mostly used for cutting interior threads was of integral construction, requiring a considerable degree of skill to regrind the same and being soon used up in the grinding. The chief difficulty in cutting interior threads arise out of the concave shape and pitch of the interior thread not affording the requisite clearance as is afforded by the convex shape of the exterior thread. I have found that a disk like cutter element having a portion of its periphery cut away to form the cutting edges may be used to cut interior threads without interference or lack of clearance.

The principal object therefore of my invention is to provide a simple and efficient tool for the purpose of cutting interior screw threads in which the cutter element is constructed so as to be readily re-ground without requiring any great degree of skill to maintain the proper thread contour and in which the cutting element may be readily replaced when used up.

My invention also relates to certain details of construction as will later appear.

The nature and characteristic features of my invention will be more readily understood from the following description taken in connection with the accompanying drawings forming part hereof, in which—

Figure 1 is a perspective view of a tool embodying the main features of my present invention; Fig. 2 is a similar view, but of a smaller sized cutter and supporting bar, showing means for using such a smaller structure in the same holder as is employed for the larger sized cutter shown in Fig. 1; Fig. 3 is a fragmentary perspective view of the end of the cutter supporting bar shown in Fig. 1, the cutter being removed; Fig. 4 is a horizontal section of the cutter element taken on the line 4—4 of Fig. 5; Fig. 5 is an end elevation of the cutter element detached; Fig. 6 is a side elevation thereof; and Fig. 7 is a rear elevation thereof.

Referring to the drawings 8 is the disk like cutter element having its periphery in cross-section of a contour complementary to that of the thread to be cut, as shown in the drawings being of the usual V shape for cutting the common threads of that shape. The disk cutter 8 is notched or cut away as at 9 to form the cutting edges 10. It will be seen that the disk 8 may be re-ground to sharpen the cutting edges 10 without requiring any great degree of skill so long as the surface adjacent the cutting edges 10 be maintained substantially radial to said disk. The cutter disk 8 is mounted on one end of a cylindrical rod or bar 11 and is secured thereto by means of a screw 12 or passing through an aperture 13 in the cutter 8, and threaded into the end of the bar 11. To prevent rotation of the disk 8 with respect to the bar 11 the rear face of the disk 8 may be provided with lugs 14 which engage a slot 15 in the end of the bar 11 (see Fig. 3).

The cylindrical rod or bar 11 to which the cutter disk 8 is secured is mounted in a holder 16 in any preferred manner so as to be readily adjustable both circumferentially and longitudinally with respect thereto, these adjustments being for the purpose of bringing the cutting edges 10 to their proper positions with respect to the work. As shown these adjustments may be accomplished by passing the bar 11 through an aperture 17 in the enlarged portion 18 of the holder 16 and clamping the same therein by means of an ordinary set-screw 19. The holder 16 is formed at one portion into a shank 20 of the usual shape of lathe tools so that the same may be readily secured in the usual tool-post of the lathe.

In Fig. 2 there is shown a smaller sized cutter and supporting bar which may be used in the same holder 16 which is employed for the larger sized cutter shown in Fig. 1 by placing the split sleeve 21 over the smaller bar 11 there shown, the outer diameter of the sleeve 21 being of the size of the aperture 17 of the holder 16.

It will be seen that the proper thread contour of the cutter disk 8 will not be destroyed in the regrinding operation as in the ordinary integral type of interior thread cutting tools. Also the cutter disk will last much longer than such integral tools and, being removable and of relatively small size, may be made of better material than the other parts of the tool without materially adding to the cost of the same.

Having thus described the nature and characteristic features of my invention, what I claim as new and desire to secure by Letters Patent is:—

1. A tool for cutting interior screw threads comprising a disk cutter element having its periphery of a contour in cross section complemental to the thread to be cut, said cutter element having a portion of its periphery cut away to form the cutting edges, a cylindrical rod or bar on the end of which said cutter element is secured, lugs on the inner faces of the cutter element and a complemental groove in the end of the rod engaged by said lugs, a screw engaging said cutter element and threaded in the end of said rod, and a holder having a transverse aperture in which said rod or bar is adjustably mounted.

2. A tool for cutting interior screw threads comprising a disk cutter element having its periphery of a contour in cross section complemental to the thread to be cut, said cutter element having a portion of its periphery cut away to form the cutting edges, a cylindrical rod or bar on the end of which said cutter element is secured, lugs on the inner faces of the cutter element and a complemental groove in the end of the rod engaged by said lugs, a screw engaging said cutter element and threaded in the end of said rod, a holder having a transverse aperture in which said rod or bar is adjustably mounted, the rod or bar being of smaller diameter than the aperture in the holder, and a split sleeve mounted on said rod in said aperture.

In testimony whereof, I have hereunto signed my name in the presence of two witnesses.

GEORGE A. PEDDLE.

Witnesses:
JAS. C. WOBENSMITH,
WM. J. McCOLGAN.

---

Copies of this patent may be obtained for five cents each, by addressing the "Commissioner of Patents Washington, D. C."